United States Patent [19]

Kaira

[11] 4,089,094
[45] May 16, 1978

[54] PRESS ROLL WITH CONTROLLABLE DEFLECTION

[75] Inventor: Lauri Olavi Kaira, Kuusankoski, Finland

[73] Assignee: Valmet Oy, Finland

[21] Appl. No.: 749,522

[22] Filed: Dec. 10, 1976

[30] Foreign Application Priority Data

Jun. 11, 1976 Finland .................................. 761696

[51] Int. Cl.² ............................................. B21B 13/02
[52] U.S. Cl. ................................................... 29/116 AD
[58] Field of Search .................. 29/116 AD, 113 AD

[56] References Cited

U.S. PATENT DOCUMENTS

| | | | |
|---|---|---|---|
| 3,119,324 | 1/1964 | Justus | 29/116 AD X |
| 3,611,529 | 10/1971 | Hold et al. | 29/116 AD |
| 3,638,292 | 2/1972 | Gaghan | 29/116 AD X |
| 3,802,044 | 4/1974 | Spillmann et al. | 29/116 AD X |

Primary Examiner—Alfred R. Guest
Attorney, Agent, or Firm—Steinberg & Blake

[57] ABSTRACT

A press roll for treating sheet material such as paper and suitable for use in the calender or press section of a paper machine. The roll includes a robust stationary shaft and a shell coaxially surrounding and spaced from the shaft and rotatable with respect thereto. In the gap between the shaft and shell is a sealing structure which surrounds a pressure zone in this gap to seal off this pressure zone, fluid under pressure being supplied to the zone by way of a duct which extends through the shaft, so that the fluid pressure in the pressure zone can be controlled to control deflection of the roll at its shell.

17 Claims, 7 Drawing Figures

PRESS ROLL WITH CONTROLLABLE DEFLECTION

BACKGROUND OF THE INVENTION

The present invention relates to press rolls.

In particular, the present invention relates to press rolls for treating sheet material such as paper and suitable for use in the calender or press section of a paper machine.

The present invention relates in particular to a press roll having a shaft surrounded by a shell which is spaced from and rotatable with respect to the shaft, the shell and shaft defining between themselves a gap in which is located a structure capable of receiving a pressurized fluid for controlling the deflection of the shell.

Press rolls of the above general type are known. The known rolls include an inner shaft and an outer shell surrounding and rotatable with respect to the shaft, and while there is a pressure zone extending between the shaft and shell, it is not possible with the previously known constructions to vary the pressure acting on the shell, particularly longitudinally of the roll. In this connection reference may be made to the German Federal Republic Pat. No. 1,026,609.

Also known in the art is a press roll for achieving a uniform pressure and having between the shaft and shell a component in the form of a cushion-like hollow member filled with a pressurized fluid and retained in place by shoulders at the edges of a recess formed in the shaft. The outer surface of the cushion-like hollow member engages a slip membrane against which the inner surface of the shell slides. A construction of this type is disclosed in German Federal Republic Pat. No. 1,111,932.

Also, there is a known press roll having its shaft provided with radially directed pressure cylinders in which pistons operate, with suitable slide shoes engaging the inner surface of the shell for receiving the forces provided by the pistons. A structure of this type is disclosed in German Federal Republic Pat. No. 1,193,792.

Also, a previously known press roll has formed in its shaft a longitudinal pressure groove in which a bar slides to operate as a piston, with a slide piece being provided and having a length equal to that of the shell, this latter piece being rigid and non-rotatably fixed to the shaft and transmitting the force to the inner surface of the shell. This pressure groove may be divided into compartments by means of partitions, with the bar which serves as a piston being correspondingly subdivided into sections so that different pressures may be achieved in the compartments, respectively. A construction of this type is disclosed in U.S. Pat. No. 3,119,324.

The known constructions of the above type suffer from several drawbacks. For example the shafts of such constructions are not as strong as desired because of the fact that such shafts require hollow interior portions to accommodate pressure-controlling structure. Also, it is not possible with the previously known constructions to achieve the desired pressure controls with the precision which is desired and in such a way that the shell can have different pressures distributed longitudinally thereof.

Moreover, the sealing structure utilized in the conventional press rolls is exceedingly complex, often requiring separate seals on the one hand to extend longitudinally of a pressure zone and on the other hand to be situated at the ends of the pressure zone.

SUMMARY OF THE INVENTION

It is accordingly a primary object of the present invention to provide a construction which will avoid the above drawbacks.

In particular, it is an object of the present invention to provide a pressure roll of the above general type which has an exceedingly strong shaft having a high degree of rigidity.

Furthermore it is an object of the present invention to provide a construction of the above type according to which the deflection of the shell can be controlled or adjusted so as to be capable of providing uniform pressures of various magnitudes as well as capable of achieving a non-uniform pressure distribution capable of correcting the sheet material in a desired manner, if necessary.

It is also an object of the present invention to provide for a press roll of the above type a sealing structure wherein the same type of seals can be used along the longitudinal sides as well as at the ends of the pressure zone.

Furthermore it is an object of the present invention to provide a construction according to which the shape of the pressure zone can be freely selected.

According to the invention the press roll includes a stationary shaft and a shell coaxially surrounding and spaced from the shaft; a bearing means being provided to support the shell for free rotary movement about the common axis of the shaft and shell. In a gap which is defined between the shaft and shell there is a sealing means which defines and surrounds a given pressure zone for sealing the latter, and fluid under pressure is supplied to this pressure zone by way of a duct means which extends through the shaft and communicates with the pressure zone.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
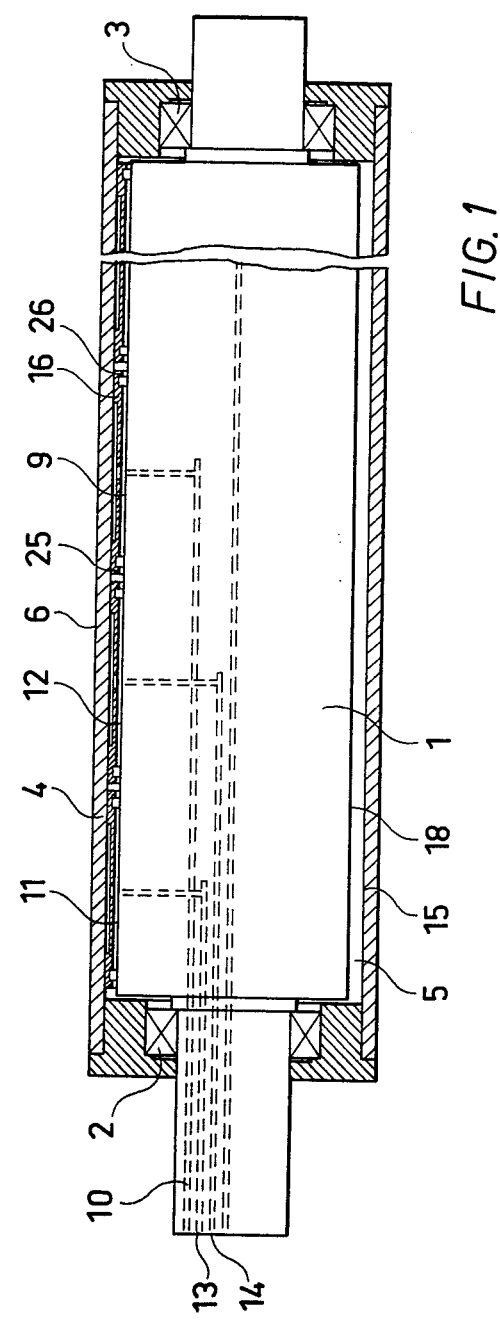
FIG. 1 is a fragmentary longitudinal sectional schematic illustration of a preferred embodiment of the invention.
Figure 2:
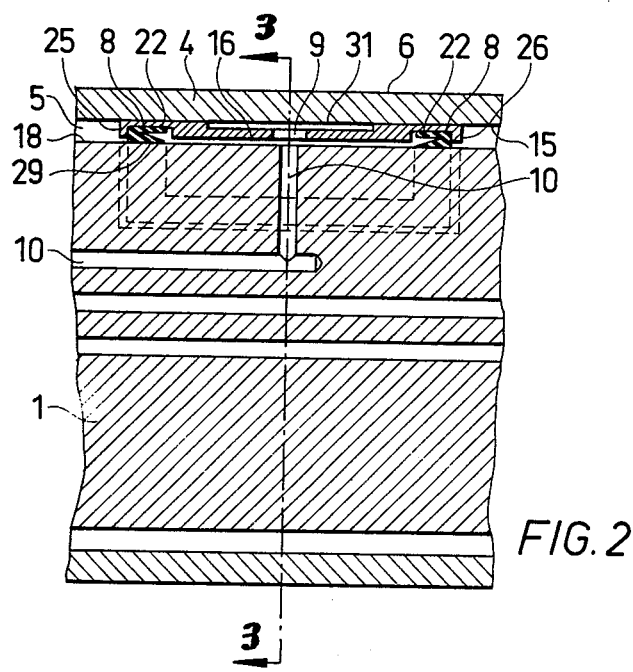
FIG. 2 is a fragmentary longitudinal section of part of a roll as illustrated in FIG. 1, the section of FIG. 2 being taken along line 2—2 of FIG. 3 in the direction of the arrows.
Figure 3:
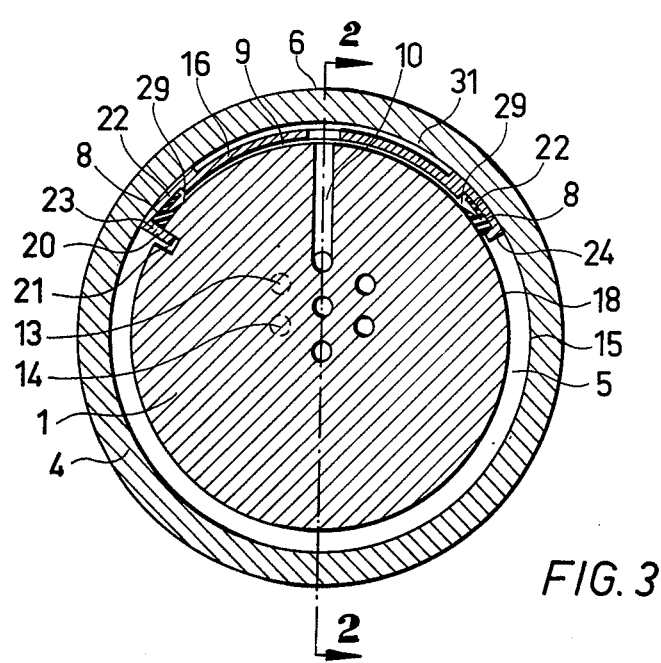
FIG. 3 is a transverse section of the structure of FIG. 2 taken along line 3—3 of FIG. 2 in the direction of the arrows.

Referring first to the embodiment of the invention which is illustrated in FIGS. 1-3, the press roll illustrated therein includes a rigid stationary shaft 1 carrying at its opposed reduced ends bearings 2 and 3 which serve to support for rotary movement with respect to the shaft 1 an outer shell 4 supported by the bearing means 2,3 for free rotary movement with respct to the stationary shaft 1. The shell 4 has an outer surface 6 which forms the outer surface of the press roll of the invention. The inner surface of the shell 4 is spaced from the outer surface 18 of the shaft 1 so as to define with the latter the cylindrical gap 5. In this gap 5 there are a plurality of pressure zones situated closely adjacent to each other and distributed longitudinally along the gap, parallel to the common axis of the shaft 1 and the shell 4, and some of these pressure zones 9, 11, and 12 are illustrated in FIG. 1, these pressure zones being of course arranged in a row at the region where the press roll engages the sheet material. Each of these pressure zones in the illustrated example is surrounded and defined by a sealing means. In the embodiment of FIGS. 1-3 the sealing means for each zone includes a slide shoe component 16 which is relatively rigid and of the arcuate configuration apparent from FIG. 3, the sealing means including in addition to the slide shoe a resilient packing means which in the embodiment of FIGS. 1-3 takes the form of a substantially square resilient packing 8 for each pressure zone. The slide shoe 16 of the sealing means of each pressure zone is formed with an endless groove 22 at its surface which is directed toward the shaft 1, and the resilient packing 8 is adhered in the groove 22 of the slide shoe as by being cemented thereto. At its periphery the slide shoe 16 has an endless flange having the flange portions 23, 24, 25, 26, illustrated in FIGS. 2 and 3, and the outer edge of the packing 8 engages this endless flange so that the latter acts to retain the packing means 8 in its proper position.

It will be noted particularly from FIGS. 2 and 3 that the resilient packing means 8 of each pressure zone has an inner edge region directed inwardly toward the pressure zone and having the form of a pair of separate lips defining between themselves a space into which the fluid under pressure extends for pressing these lips respectively against the slide shoe 16, in the groove 22 thereof, and the outer surface of the shaft 1. Thus FIGS. 2 and 3 show the lip 29 pressed by the fluid under pressure against the exterior surface of the shaft 1. In this way an exceedingly effective seal is provided for the pressure fluid.

Each of the pressure zones is placed in communication with a source of fluid under pressure by way of a duct means which communicates with the pressure zone and extends through the shaft 1. Thus it will be seen that the pressure zone 9 communicates through the duct 10 with the exterior of the shaft 1, at the left end thereof, as viewed in FIG. 1. The duct means for each pressure zone takes the form simply of a pair of bore portions one of which extends parallel to the axis of the shaft 1 and the other of which extends radially from the axial bore portion to the particular pressure zone. Thus FIG. 1 illustrates not only the duct means 10 for the pressure zone 9 but also the duct means 13 for the pressure zone 11 and the duct means 14 for the pressure zone 12, and of course additional pressure zones and ducts means are provided as is apparent from FIG. 1. Thus each pressure zone has its own duct means in the form of a suitable passage or bore formed in the shaft 1. These several duct means communicate at the left end of the shaft 1 with suitable pipes or tubes which in turn communicate with a pressure pump and with separate pressure controls respectively provided for the several tubes or pipes which respectively communicate with the several duct means, so that in this way it is possible to provide separate pressure regulation for the separate zones. The manner in which separate pressure regulation can be provided for each of the pressure zones is known and therefore not illustrated since it forms no part of the present invention. Thus, by way of the independent pressure regulation of the zones which are arranged one closely next to the other in a row it is possible very precisely to regulate the deflection of the roll along its entire length.

A connecting means is provided for connecting the slide shoe 16 of each pressure zone to the shaft 1 so as to prevent each slide shoe 16 from turning with the shell. For this purpose the slide shoe 16 has along one longitudinal edge, namely the edge where the flange portion 23 is located, an extension 20 of this flange portion, this extension 20 projecting into a groove 21 formed axially along the exterior of the shaft 1, so that in the manner shown in FIG. 3, the slide shoe 16 is prevented from turning together with the shell 4. Each slide shoe 16 is formed with a central opening through which the lubricating oil, which also acts as the pressure fluid, has access to the inner surface 31 of the shell 4. In this way a hydrostatic lubrication is provided.

As is apparent from FIGS. 2 and 3, at its outer edge region which is formed with the groove 22 the shoe 16 has a thickness which is almost equal to the thickness of the gap 5. Thus in the event that the force provided by the fluid under pressure is too small to oppose the force acting on the shell, the shell will in any event be supported by the shoe 16 which acts as a back-up member to limit the extent to which the shell can be deflected toward the shaft. A suitable return pipe is provided for the oil which leaks, and since such a leakage oil return pipe is known it is not illustrated.

Figure 4:
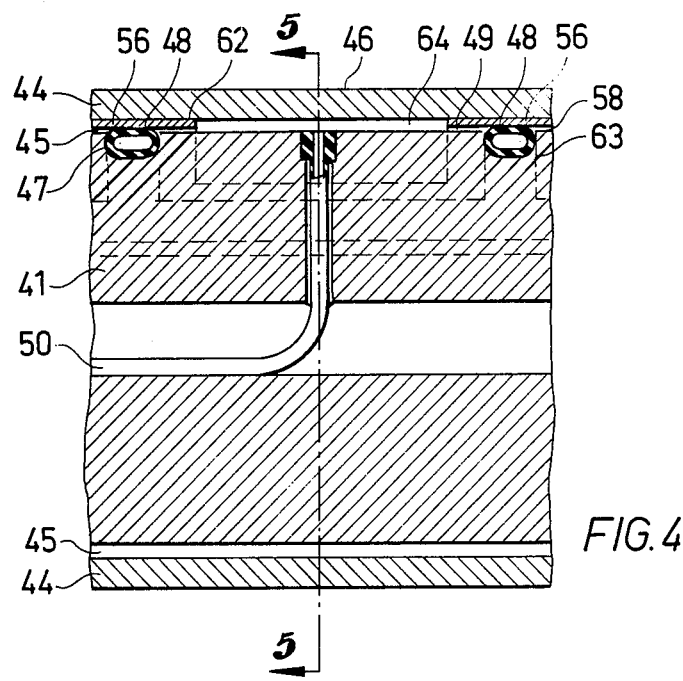
FIG. 4 is a fragmentary longitudinal section of another embodiment of a press roll according to the invention, the section of FIG. 4 being taken along line 4—4 of FIG. 5 in the direction of the arrows.
Figure 5:
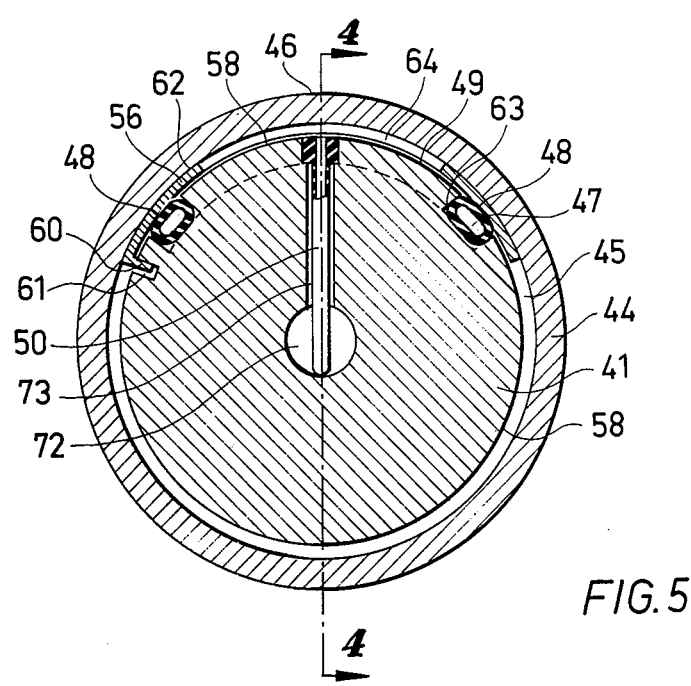
FIG. 5 is a transverse section of the structure of FIG. 4 taken along line 5—5 of FIG. 4 in the direction of the arrows.

In the embodiment of the invention which is illustrated in FIGS. 4 and 5, the press roll also has a substantially rigid stationary shaft 41. The shell 44 surrounds the shaft 41 and is supported by suitable unillustrated bearings so as to define with the shaft 41 the gap 45. Thus, the shell 44 provides the roll with its exterior acting surface portion 46. In this embodiment also the gap 45 is longitudinally subdivided into a series of pressure zones 49 situated in a row closely adjacent to each other and each defined by an endless sealing means at each zone. In this case the sealing means includes a slide shoe 56 which is in the form of a portion of an elongated slide shoe member which is common to all of the pressure zones 49 and which has a uniform thickness. Between the slide shoe 56 and the shaft 41 the sealing means includes the resilient packing means 48 which has the configuration of a ladder, in that the resilient packing means 48 has a pair of longitudinal side portions extending in common along the entire series of pressure zones 49 and between these longitudinal side portions the arcuate transverse portions, two of which are shown in FIG. 4, with each of these transverse portions of the packing 48 being common to and separating a pair of adjacent pressure zones 49. In this embodiment the shaft 41 is formed with grooves 63 having a configuration conforming to that of the packing means 48 and receiving the latter so as to retain the packing means 48 in position. The resilient packing means 48 is in the form of a flexible tubular structure, made of a suitable elastic material, and the interior of this structure communicates through a suitable unillustrated tube with a source of fluid under pressure which thus becomes situated in the interior space 47 of the packing 48. This pressure is provided by way of a suitable pump and the pressure provided in the space 47 of the packing 48 exceeds the pressure in each pressure zone 49. In this embodiment the duct means for each pressure zone 49 takes the form of a flexible tube 50 communicating with each pressure zone 49 in the manner shown for the tube 50 illustrated in FIGS. 4 and 5. Thus the shaft 41 is provided with radial bores respectively receiving radial portions of the several tubes 50. Also the shaft 41 is formed with a common axial bore 72 into which all of the tubes 50 extend, this axial bore 72 extending all the way to one of the ends of the shaft 41 so that the several tubes 50 can respectively communicate with the source of fluid under pressure which can be separately regulated for the several tubes 50 so that the series of pressure zones 49 can be respectively provided separately with predetermined pressures. Thus, with this embodiment also it is possible very precisely to control the deflection of the roll along the entire length thereof. As is apparent from FIG. 5, the slide shoe 56 has along one of its longitudinal edges a flange 60 extending into the axial groove 61 formed in the shaft 41, so that this structure forms a connecting means for connecting the slide shoe 56 to the shaft 41 in the manner preventing the slide shoe 56 from turning with the shell 44. At each of the pressure zones 49 the slide shoe 56 is formed with a relatively large opening 64 which has an area which is only slightly smaller than the area of the pressure zone. The common slide shoe member of which each shoe 56 forms a portion is of a uniform thickness throughout its entire length.

The press roll of the invention may have between the slide shoe and shaft, instead of resilient packings as described above, other types of packings, and instead of utilizing flanges, for example, to maintain the packing in position, the resilient packing may be fixedly attached both to the slide shoe and the shaft in any well known manner such as by being adhered to these components with a suitable cement. Each pressure zone with the above embodiments may have its pressure controlled in a stepless manner independently of the other pressure zones by way of a suitable pressure regulator so that along the entire length of the roll the supporting force provided by the fluid under pressure for the roll at the several pressure zones can have any desired magnitude and can be distributed in any desired way longitudinally along the pressure roll. The control of the supporting force may be brought about by selecting suitable valves the particular pressure for a particular pressure zone from among a number of regulated pressures which are available. It is also possible to exercise for each pressure zone either a predetermined pressure or for the possibility of eliminating any pressure from a particular pressure zone, so that certain zones may be in a pressure-free state. For this purpose the duct means which communicates with the particular pressure zone can simply be placed in communication with the outer atmosphere.

Thus, in accordance with the invention the distribution of the supporting force present in the roll may be controlled in such a way that the pressure zones are provided with pressure regulated for the entire roll, and some of the pressure zones if desired may be provided not only with pressures different from pressures in other zones but also some of these zones may be rendered pressure-free by the use of suitable valves provided for this purpose. Thus it is possible to maintain an overall-regulated pressure or a differential pressure longitudinally along the roll. The resilient packing which forms part of the sealing means may if desired also have lips directed outwardly away from the pressure zone.

Of course instead of the above-described connecting means for connecting the slide shoe to the shaft, other means which are known may be used, such as, for example, pins and mating the bores which respectively receive the pins.

As is apparent from the above description, the press roll of the invention has a rigid shaft of large diameter, and this shaft is entirely solid with the exception of the extremely small bores or grooves which are provided to form the duct means leading the pressure fluid to the several pressure zones in the case of FIGS. 1-3 or provided for receiving the flexible tubes 50 of FIGS. 3 and 4.

In the gap between the shell and shaft, this gap being of a small radial dimension, there is an extensive possibility of controlling pressure along the several pressure zones which are separated from each other by the sealing means. Thus it is possible to obtain for the roll of the invention either a uniform pressure or a non-uniform pressure distribution. It will be noted that the shaft of the roll of the invention has no bores for accommodating pressure cylinders or to form pressure cylinders or the equivalent thereof, so that such a construction need not detract from the strength of the shaft.

As contrasted with prior art press rolls, the roll of the invention has a shaft of greater rigidity so that it is capable of withstanding higher pressures while at the same time there is the possibility of controlling the deflection of the shell in the most varied manner.

Figure 6:
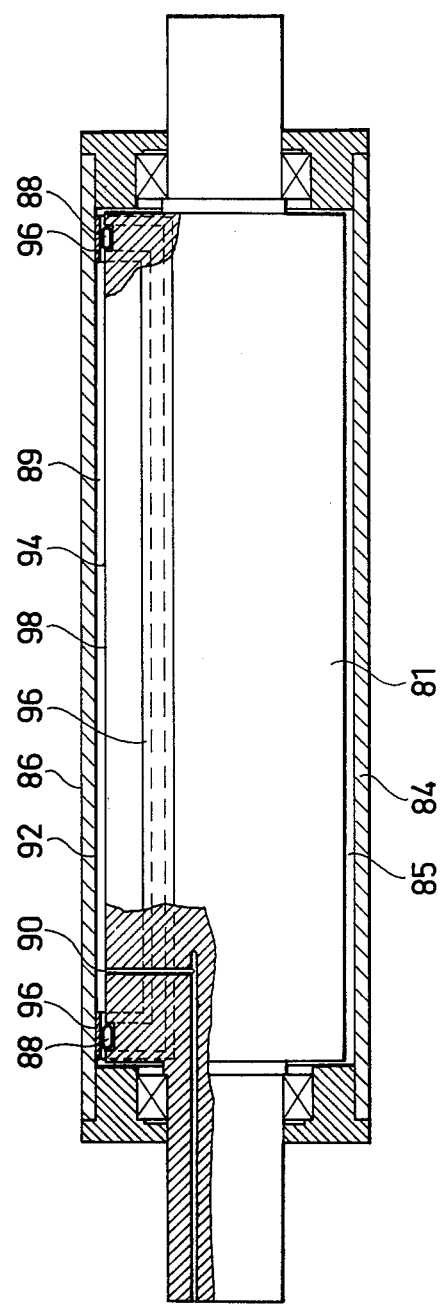
FIG. 6 is a longitudinal sectional elevation of a third embodiment of a press roll according to the invention.

Referring now to the embodiment of the invention which is illustrated in FIG. 6, this embodiment includes a stationary shaft 81 which has a great rigidity. The shaft 81 is surrounded by the rotary shell 84 which has the surface 86 which acts on the sheet material. The shell 84 is supported for rotary movement by a bearing means as illustrated in FIG. 6 and as was described above in connection with FIG. 1. Between the shell 84 and the shaft 81 there is the cylindrical gap 85 where the elongated pressure zone 89 of FIG. 6 is located. This pressure zone extends along substantially the entire length of the shell. The sealing means of this embodiment includes the slide shoe 96 which has the arcuate ends shown in FIG. 6 and the longitudinal portions extending therebetween parallel to the axis of the shaft 81, this slide shoe 96 engaging the inner surface 92 of the shell 84, thus surrounding the pressure zone 89. This slide shoe 96 is prevented from rotating with the shell as by a connecting means of the type described above. The sealing means includes in addition to the slide shoe 96 a resilient packing 88 in the form of elongated tubular member of elastic material extending along the slide shoe 96 between the latter and the shaft 81. The shaft 81 is formed with a groove which receives the endless resilient packing means 88 to maintain the latter in its proper position. This seal 88 also endlessly surrounds the pressure zone 89.

FIG. 6 illustrates the duct means 90 which has a construction which is the same as the duct means 10 of FIGS. 1-3, for example, this duct means serving to direct the fluid under pressure into the pressure zone 89. Thus the fluid under pressure will in this case directly engage the exterior surface 98 of the shaft 81 as well as the interior surface 92 of the shell 84. Thus with the embodiment of FIG. 6 there is a large pressure zone. A suitable lubricating oil can be used as the pressure fluid so as to also serve for lubrication purposes. Thus the pressure in the pressure zone 89 presses the slide shoe 96 against the hydrodynamically lubricated inner surface 92 of the shell 84, thereby providing a supporting force at the area where the slide shoe 96 is located. In the area of the large opening 94 of the shoe 96 the pressure medium produces a hydrostatic supporting force directed immediately at the inner surface 92 of the shell 84.

Figure 7:
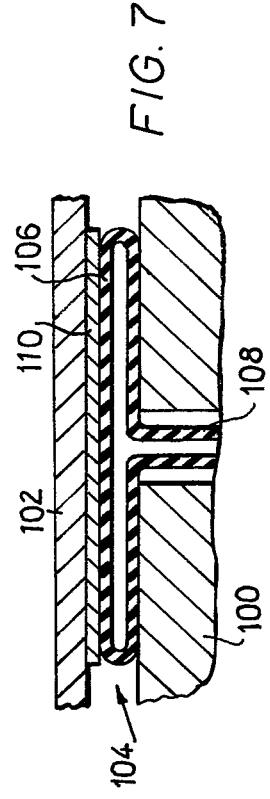
FIG. 7 is a fragmentary sectional elevation of yet another embodiment of a roll according to the invention.

A further possible embodiment of the invention is illustrated in FIG. 7. FIG. 7 schematically illustrates a shaft 100 which may have the same construction as any of the above shafts as well as an outer shell 102 which may have the same construction as any of the above shells and which is supported in the same way for free rotation with respect to the stationary shaft 100. In this embodiment there is situated between the shell 102 and the shaft 100, in the gap 104 a resilient bag 106 made of rubber, for example, and having a configuration which corresponds to that of the desired pressure zone. This bag 106 communicates through a tubular extension 108 with a source of fluid under pressure such as a suitable liquid, and the shaft 100 is formed with bores for the tubes 108. A suitable slide shoe 110 is provided between the bag 106 and the inner surface of the shell 102, and in this case lubricant from a separate source is provided to lubricate the interface between the shoe 100 and the shell 102. Thus, in this embodiment it is the outer peripheral edge region of the bag 106 which forms the sealing means for the pressure zone which in this case is determined by the bag 106 itself, with the pressure fluid which acts on the shell being effective through the wall of the bag 106 and the slide shoe 110. Thus in this embodiment the entire pressure fluid for a given pressure zone is confined within the bag 106 whose outer edge region forms the sealing means.

Of course, a tube similar to the tube 108 may communicate with the sealing means 48 of FIGS. 4 and 5 to supply fluid under pressure to the hollow interior 47 thereof.

The slide shoe 110 of FIG. 7 is maintained stationary with respect to the shell 102 in any suitable way as by the above-described constructions, and the bag 106 may be maintained stationary either by adhering it to the exterior surface of the shaft 100 and/or the interior surface of the slide shoe 110, and/or by providing the slide shoe 110 with an exterior peripheral flange within which the bag 106 is confined.

What is claimed is:

1. A press roll for treating a sheet material such as paper and suitable for use in a calender or press section of a paper machine, comprising an elongated stationary solid shaft, a cylindrical shell coaxially surrounding said shaft, said shaft and shell having a common axis and respectively having outer and inner surfaces spaced from each other to define a cylindrical gap between said shaft and shell, bearing means supporting said shell for free rotary movement about said common axis of said shaft and shell, a plurality of endless sealing means situated closely adjacent each other in and distributed in a row longitudinally along said gap parallel to said axis for defining between said shaft and shell a row of pressure zones respectively surrounded by said sealing means, and a plurality of duct means communicating with said pressure zones and extending therefrom along the interior of said shaft for conveying fluid under pressure to said pressure zones, so that by individually controlling the pressure of the fluid conveyed respectively to said pressure zones the operation of said shell with respect to sheet material engaging the same can be controlled.

2. The combination of claim 1 and wherein each sealing means includes a substantially rigid slide shoe situated in said gap and engaging said inner surface of said shell, connecting means connecting said shoe to said shaft for preventing rotary movement of said shoe with said shell so that said shell slides with respect to said shoe, and a resilient packing means situated between and engaging said shaft and shoe for cooperating with said shoe for sealing off a pressure zone to which fluid pressure is supplied by one of said duct means.

3. The combination of claim 2 and wherein each sealing means includes a slide shoe forming a portion of an elongated slide shoe member common to all of said pressure zones.

4. The combination of claim 3 and wherein said common shoe member is of a uniform thickness.

5. The combination of claim 2 and wherein said plurality of sealing means respectively include a plurality of separate shoes situated in a row and a plurality of separate endless packing means respectively cooperating with said shoes and situated between the latter and said shaft.

6. The combination of claim 3 and wherein said resilient packing means has between adjacent pressure zones a portion common to both of said zones.

7. The combination of claim 2 and wherein said shoe includes a retaining means cooperating with said packing means for preventing the latter from moving with respect to said shoe.

8. The combination of claim 2 and wherein said shoe and shaft respectively have endless surface regions between which said packing means is located, and one of said surface regions being formed with a groove receiving said packing means for retaining the latter in a predetermined position with respect to said shoe and shaft.

9. The combination of claim 2 and wherein said packing means has an inner edge region directed inwardly toward said pressure zone and surrounding the same, and said packing means having at said inner edge region thereof a pair of endless lips spaced from each other and respectively engaging the outer surface of said shaft and an inner surface of said shoe which is directed toward said shaft.

10. The combination of claim 2 and wherein said resilient packing means is in the form of a tube of elastic material having in its interior a pressure greater than the pressure of the fluid at said zone.

11. The combination of claim 2 and wherein said shoe has a central region formed with an opening passing through said shoe.

12. The combination of claim 11 and wherein said shoe surrounds said pressure zone with said opening of said shoe having an area which is only slightly less than the area of said pressure zone.

13. The combination of claim 2 and wherein said shoe has a thickness which is only slightly less than the thickness of said gap.

14. The combination of claim 2 and wherein said packing means is adhered both to said shoe and said shaft.

15. The combination of claim 2 and wherein said packing means is in the form of a bag of elastic material having a configuration conforming to the configuration of the pressure zone and communicating with said duct means.

16. The combination of claim 2 and wherein said shoe has only an outer edge region engaging said shell.

17. The combination of claim 2 and wherein said shoe has an outer edge region provided with a flange directed from said shoe toward said shaft with said flange surrounding said packing means to retain the latter in place.

* * * * *